2,871,195

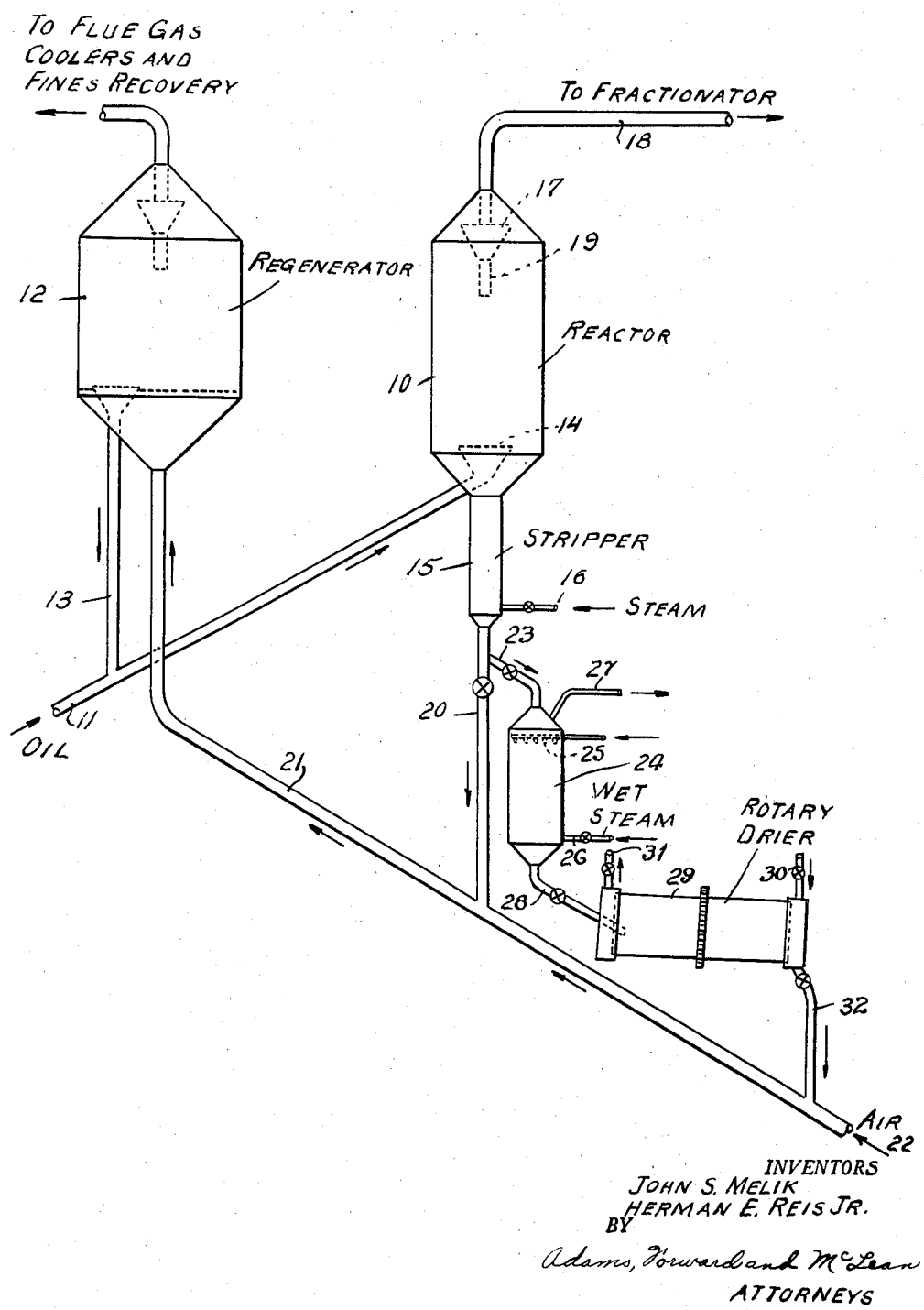

PROCESS FOR REACTIVATING A SPENT SILICA-MAGNESIA CRACKING CATALYST

John S. Melik, Hammond, Ind., and Herman E. Ries, Jr., Chicago, Ill., assignors to Sinclair Refining Company, New York, N. Y., a corporation of Maine Application April 16, 1953, Serial No. 349,289

6 Claims. (Cl. 252—411)

Our pending application Serial No. 79,674, filed March 4, 1949, now abandoned, discloses water treatment of small pore silica-magnesia cracking catalysts to improve surface area and activity, and it claims a method for improving the cracking capacity of the catalysts by water treatment and the improved silica-magnesia cracking catalysts and cracking processes resulting from application of our method. Our present invention relates to water treatment of silica-magnesia cracking catalysts and is specifically concerned with methods for improving their susceptibility to regeneration by burning off carbonaceous matter deposited thereon during the cracking process and the application of this improvement to the regeneration step of pyrolytic conversion processes utilizing silica-magnesia catalysts to improve their coke burning capacity. This application is a continuation-in-part of our application Serial No. 102,816, filed July 2, 1949, now abandoned.

Application Serial No. 79,674 points out that we have discovered that a conventional silica-magnesia cracking catalyst may be contacted with water to effect remarkable increases in cracking activity and surface area while maintaining in some instances improved selectivity with respect to product distribution. Both virgin catalyst and equilibrium catalyst; i. e. catalyst that has reached an equilibrium activity value through continued use, regeneration and re-use; respond to this water treatment. In that application we emphasized application of water treatment to regenerated catalysts, i. e. catalysts in which the coke deposited thereon during a cracking process has been burned off, because we consider that the best way to apply water treatment commercially either to maintain a high catalyst activity for the catalyst inventory or to permit more severe regenerating conditions and thus greater coke burning capacity in regeneration by compensating for activity and area losses. We have now discovered, however, that water treatment of spent silica-magnesia cracking catalysts directly improves their carbon burning rates, i. e. the rates at which carbon deposited on the catalysts can be burned off during regeneration. For example, water treatment for 24 hours at 212° F. of DA-5 silica-magnesia catalyst bearing about 2.4 weight percent of carbon increases the burning rate almost three-fold at 1100° F. and somewhat less, say about two-fold, at 1050° F. regeneration temperature. This improved carbon burning rate of silica-magnesia catalysts is extremely important since one of the principal drawbacks in using these catalysts is their low burning rate during regeneration which requires excessive amounts of air and reducing capacity. Accordingly, this application is directed to water treatment of spent or used silica-magnesia cracking catalysts before regeneration where improvement in coke burning capacity is the dominant consideration.

We have found that if the desired increase in carbon burning rate of the silica-magnesia catalysts is to be obtained the presence of some liquid phase water in contact with the surface of the catalysts in the treating operation is essential. The catalysts may be contacted with water in a continuous phase or they may be treated with steam under conditions of temperature and pressure which will insure the contact of the catalyst with water in the liquid phase. For instance, we have found that treatment with low pressure steam so that capillary condensation is effected produces effective results and represents a particularly advantageous method for applying water treatment to commercial cracking catalysts. Of course, catalysts in a commercial unit is at high temperatures, e. g. about 900° F. when leaving the reactor of a fluid catalyst unit; therefore, it is necessary to pass the catalyst to an intermediate cooling zone if superatmospheric pressures in the treating zone are to be avoided. Accordingly, we recommend the use of atmospheric pressure for convenience in handling but our improvement is obtained under the conditions of either reduced or elevated pressures as long as they are sufficient to insure the contact of liquid phase water with the catalyst surface during its treatment.

The temperature of our catalyst treatment should be maintained between about 150 to 600° F. We have found that a moderately high temperature, say within the approximate range of 150 to 200° F., is an especially desirable condition for effecting the catalyst treating operation. At higher temperatures, say upwards of 500 to 600° F., catalyst area begins to fall off slightly. When steam is used as a catalyst contact medium it is desirable to vary the temperature from 212 to 600° F. with the pressure being sufficient to insure the presence of liquid phase water.

The concentration of water to catalyst in our treatment may be varied over a wide range without materially affecting the results obtained. We have used a ratio of about 4:1 by weight of water to catalyst in small scale work for convenience and ease of manipulation. The water to catalyst contact time in the treating zone may vary from several minutes to about 60 hours as long as this contacting time is sufficient to effect a substantial increase in the carbon burning rate of the catalyst. Although 24 to 60 hours of water treatment appear to produce maximum improvement we have obtained substantial increases in carbon burning rate after a very short period of water to catalyst contact. Preferably, we consider that a contact period of at least about one-half hour should be maintained for best results. The factor of contact time is, of course, a variable affording the operator control over the extent of improvement in carbon burning rate effected. It is therefore important in a sense that at least several minutes are required to produce the desired result while longer periods depending upon the temperature utilized are usually necessary to effect substantial increases in carbon burning rate.

In order to show that the improvement effected by the water treatment of silica-magnesia catalysts as claimed may not be effected by treatment with steam, experiments have been performed which show that the treatment claimed is substantially inoperative unless water in the liquid phase is present. For instance, steam treatment under conditions of temperature and pressure precluding the presence of a water phase does not effect the changes and improvement obtained through liquid phase water treatment. Experiments also confirm the teaching generally accepted in the art that steam treatment is characterized by two deleterious effects, namely a reduction in the surface area of the catalyst and a decrease in specific cracking activity.

Experiments have also been conducted to show that the silica-magnesia type cracking catalysts are uniquely susceptible to improvement by the water treatment of our invention. These experiments establish that our method is applicable only to silica-magnesia catalysts as opposed to other conventional catalysts such as silica-alumina and natural clay types.

Tables I to IV set forth the results of these experiments. It should be noted that each series of samples was treated under comparable conditions except as specifically noted. Catalyst area was measured by the well known Brunauer-Emmet-Teller nitrogen adsorption method. Cracking activity was determined by the well known Jersey D+L bench scale test method on a standard gas oil sample. Activities marked with an asterisk are estimated from area-activity correlation diagrams. In the tables the commercial catalysts used are further identifiable as follows:

| Catalyst | Type | Weight Analysis |
|---|---|---|
| Nalco | fluid-synthetic silica-magnesia. | 25% MgO, 75% SiO$_2$. |
| DA-5 | do | 35% MgO, 65% SiO$_2$. |
| Filtrol | fluid-acid treated natural clay. | 15% Al$_2$O$_3$, 72% SiO$_2$, balance MgO, CaO, Fe$_2$O$_3$ and SO$_4^=$. |
| Aerocat | fluid-synthetic silica alumina. | 11% Al$_2$O$_3$, 89% SiO$_2$. | significant increase in the catalyst area and specific cracking activity, but causes a two to threefold increase in the specific burning rate of the catalyst. This result is sharply contrasted with the results of treating other catalysts than silica-magnesia catalysts according to our invention. For example, when a sample of equilibrium Filtrol catalyst was subjected to water treatment under comparable conditions, the catalyst area increased from 130 to 140 square meters per gram, the D+L activity increased from 26.5 to 29.0 and the carbon burning rate remained substantially unchanged, changing from 48 to 49 pounds carbon per hour per ton of catalyst.

The area and pore structure of the catalyst appears to be important with respect to improvement in burning rate. Thus the burning rate of DA-5 silica-magnesia catalyst, having an average pore radius of about 16 angstrom units (11 angstroms for the virgin catalyst), improved more than two-fold after water-treating for regeneration at 1050° F., while the burning rate of Filtrol natural clay catalyst containing 1.58% carbon of much larger pore size range (80% above 20 to 25 angstrom units in radius) improved only slightly after water treatment for regeneration at 1050° F. These results may be related to the major increase in cracking activity and surface area that accompanies water treatment of silica-magnesia catalyst compared to the minor improvement in activity and area effected by water treatment of clay type catalyst. Nalco silica-magnesia catalyst, having pore radii of about 14 and 21 angstrom units for the virgin and equilibrium materials closely approximates DA-5 silica-magnesia in response to water treatment.

The data of Table II illustrates that steam treatment of virgin cracking catalysts under conditions not admitting capillary condensation or in any other manner permitting the presence of liquid phase water does not have a beneficial effect on catalyst area and cracking activity, but rather has a deleterious effect.

TABLE I

*Water treatment of equilibrium silica-magnesia cracking catalyst*

| Catalyst | Water Treatment | | Catalyst Area, sq. m./g. | | D+L Activity | | Carbon Burning Rt., lbs. C/hr./ton/Cat/O$_2$ p. p. | |
|---|---|---|---|---|---|---|---|---|
| | Temp., °F. | Time, hrs. | Before | After | Before | After | Before | After |
| A. Nalco | 212 | 24 | 295 | 572 | 34.0 | 46.0 | 22 | 43 |
| B. DA-5 | 212 | 24 | 284 | 434 | 43.0 | 49.4 | 33 | 86 |

The above table shows that water treatment of equilibrium silica-magnesia cracking catalyst not only effects

TABLE II

*Steam treatment of virgin cracking catalysts*

| Catalyst | Steam Treatment | | | Catalyst Area, sq. m./g. | | D+L Activity | |
|---|---|---|---|---|---|---|---|
| | Temp., °F. | Time, hrs. | Press., p. s. i. g. | Before | After | Before | After |
| A. Nalco | 1,150 | 24 | 1,000-300 | 578 | 302 | 56.0 | 26.5 |
| B. Nalco | 1,150 | 23 | 400 | 578 | 299 | 56.0 | 30.5 |
| C. DA-5 | 1,175 | 24 | 400 | 318 | 128 | 51.0 | 22.5 |
| D. Filtrol | 1,250 | 24 | 0 | 271 | 128 | 43.3 | 23.5 |
| E. Filtrol | 1,205 | 24 | 60 | 271 | 72 | 43.3 | 17.0 |
| F. Aerocat | 1,050 | 24 | 75 | 651 | 141 | *56.0 | *24.0 |

The following table shows the effect of our water treatment on the same samples of virgin cracking catalysts which were steam de-activated in Table II. The letters identifying each sample of catalyst in Table III represent the steam de-activated product of the correspondingly by lettered sample of virgin catalyst listed in Table II.

TABLE III

*Water treatment of steam deactivated virgin cracking catalyst*

| Catalyst | Water Treatment | | Catalyst Area, sq. m./g. | | D+L Activity | |
|---|---|---|---|---|---|---|
| | Temp., °F. | Time Hrs. | Before | After | Before | After |
| A. Nalco | 200 | 24 | 302 | 464 | 26.5 | 58.5 |
| B. Nalco | 212 | 24 | 299 | 508 | | |
| C. DA–5 | 212 | 24 | 128 | 355 | 22.5 | 50.0 |
| D. Filtrol | 212 | 24 | 128 | 136 | 23.5 | 25.0 |
| E. Filtrol | 212 | 24 | 72 | 72 | 17.0 | *17.0 |
| F. Aerocat | 212 | 24 | 141 | 153 | *24.0 | *26.0 |

This data illustrates that water treatment of steam de-activated virgin silica-magnesia catalyst has the opposite effect of steam treatment and restores both lost area and activity to the silica-magnesia catalyst but has little beneficial effect on the natural clay and silica-alumina catalysts tested.

TABLE IV

*Steam treatment of equilibrium silica-magnesia catalyst (Nalco)*

| | Steam Treatment | | | | Catalyst Area, sq. m./g. | |
|---|---|---|---|---|---|---|
| | Temp., °F. | Time, hrs. | Pres. | Capillary Condensation | Before | After |
| A | 218–224 | 20 | atm | yes | 295 | 546 |
| B | 218–240 | 24 | atm | yes | 295 | 529 |
| C | 300 | 14 | atm | no | 295 | 301 |
| D | 510 | 14.5 | atm | no | 295 | 295 |
| E | 1,030 | 16 | atm | no | 295 | 322 |
| F | 1,175–1,185 | 18 | atm | no | 295 | 302 |
| G | 1,259–1,300 | 3 | atm | no | 295 | 308 |

The tests of Table IV illustrate the effect on equilibrium catalyst area by treatment according to our claimed process (A and B) compared with the effect by treatment with steam under conditions not providing capillary condensation or the presence of liquid phase water. In order to illustrate this effect further, an additional experiment was performed under comparable conditions to the experiments in Table IV, employing a temperature of 600 to 610° F. at a pressure of 1700 p. s. i. to insure capillary condensation. The treatment was carried out for a period of 6⅔ hours at the end of which a nitrogen determination of catalyst area was made. It was found that unlike the similar test (Example D in Table IV in which no capillary condensation took place) equilibrium Nalco catalyst so treated increased in area from 295 square meters per gram to 491 square meters per gram which was an increase of the same order as observed in examples A and B which were carried out for three to four times as long a period of time.

The following examples illustrate certain aspects of our invention but are not intended to be limiting with respect to the conditions or mode of application. In the examples, familiar commercial silica-magnesia catalysts are treated, which may be prepared by various methods usually involving precipitation or deposition or co-precipitation of magnesia on or with silica gel. See Elkin, Shull and Roess, "Ind. Eng. Chem.," 37, 327 (1945), for example.

EXAMPLE I

A 15-gram sample of spent DA–5 silica-magnesia catalyst from pilot plant processing containing about 2.4% carbon was regenerated and required 0.901 cubic feet of air for 62 minutes at approximately 580° C. (1076° F.) catalyst temperature to reduce the percent carbon to 0.16%. When a 15-gram sample of this catalyst was treated with water for 24 hours at 212° F., the catalyst was regenerated to 0.12% carbon on catalyst with only 0.375 cubic feet of air in 35 minutes at a somewhat lower catalyst temperature.

EXAMPLE II

A second sample of an equilibrium DA–5 silica-magnesia catalyst, which contained about 2.4% of highly refractory carbon, was treated with water for 24 hours at 212° F. When the carbon was burned off in a small quartz reactor, in which a fluidized bed was maintained by passage of the measured volumes of regenerating air, it was determined that the burning rate had been increased about three-fold at a regenerating temperature of 1100° F. and about two-fold at a regenerating temperature of 1050° F. by the water treatment. The area, activity and burning rate (in pounds of carbon per hour per ton of catalyst per p. s. i. of $O_2$ partial pressure) data follow:

| | Relative Activity | D+L | Gas Factor | Carbon Factor | Area, sq.m./g. |
|---|---|---|---|---|---|
| A. Before Water Treating | 37.9 | 34.5 | 0.89 | 1.20 | 180 |
| B. After Water Treating and Carbon Removal | 67.8 | 47 | 0.73 | 0.99 | 340 |
| C. After Water Treatment without Carbon Removal | 71 | 48 | 0.89 | 1.14 | |

| | St. of $CO_2$ Formed | $CO_2/CO$ ratio | Specific Burning Rate #C/hr./ton cat./p. s. i. $O_2$ p. p. | |
|---|---|---|---|---|
| | | | (At 1,100° F.) | (At 1,050° F.) |
| A. Before Water Treating | 0.3088 | 1.4 | 2.2% C—133<br>1.9% C—120<br>1.7% C— 94<br>1.6% C— 78<br>1.45% C— 62 | 2.4% C— 54<br>2.2% C— 52<br>2.0% C— 49<br>1.9% C— 44<br>1.8% C— 42 |
| B. After Water Treating | 0.3954 | 1.8 | 2.2% C—340<br>1.9% C—315<br>1.65% C—230<br>1.4% C—180<br>1.2% C—130<br>1.05% C—105 | 2.4% C—100<br>2.2% C—102<br>2.0% C—100<br>1.8% C— 75<br>1.7% C— 65<br>1.6% C— 52 |

It was noted in adsorption studies of the untreated materials that the rate of low temperature nitrogen adsorption was extremely slow but became rapid after the water treatment or after removal of the carbon by burning.

We have also found that the susceptibility in response of various spent catalysts to water treating with respect to improvement in carbon burning rate depends upon the nature of the carbon deposit. For example, carbon built up in successive reaction and regeneration cycles is much more refractory in regeneration than carbon deposited in laboratory carbonization.

One method of applying our improved catalyst treating process to commercial cracking processes is illustrated in the accompanying drawing representing schematically the flow of catalyst and oil in the major elements of a fluid catalyst type unit. Preheated charge oil is charged to reactor 10 by means of reactor riser 11. Freshly regenerated catalyst from regenerator 12 is continuously added to the charge oil stream by means of regenerator standpipe 13. The mixture of charge oil and catalyst enters rector 10 through cone shaped distributing plate 14 and forms a dispersed phase or bed in the reactor. Catalyst separating from the dispersed phase falls to the bottom of the reactor and is withdrawn through stripping well 15 in which it is contacted with steam as by line 16 to remove adherent oil. The reaction vapors pass overhead from reactor 10 through a nest of cyclone separators 17 by line 18 to a fractionating system (not shown). Catalyst separated in cyclones 17 is returned to the catalyst bed by means of dip leg 19. Stripped catalyst ordinarily is passed to regenerator 12 by line 20 and regenerator riser 21 assisted by carrier air introduced as at 22. According to our invention a slip stream of spent catalyst is continuously or intermittently withdrawn from line 20 by means of line 23 to treating drum 24. Since the catalyst is at high temperature and it is necessary that the treatment include some contact, if only through capillary condensation, of catalyst with liquid phase water, a cooling water spray is provided as at 25. Waste steam is introduced to treating drum 24 by means of line 26 and waste steam is released overhead through line 27.

Treated catalyst may be directly charged to the regenerator as by regenerator riser 21, but if the catalyst is superficially wet it is usually desirable to dry the catalyst in order to maintain flowability. Treated catalyst then may be passed from treating drum 24 by line 28 to rotary drier 29 in which it is contacted countercurrently with hot air, superheated steam, flue gas or other hot inert gas. The heating gas is admitted to drier 29 through line 30 and is released through line 31. Treated catalyst is withdrawn from drier 29 through line 32 to regenerator riser 21.

Where relatively small quantities of spent catalyst are water treated, the material may be handled as a slurry and be admitted directly to regenerator 12. However, where relatively large quantities of water vapor would be released within the regenerating system it is usually desirable to dry the catalyst after water treatment, or alternatively maintain the treating conditions in drum 24 such that contact with liquid phase water is effected predominantly by capillary condensation through the use of steam at or just above the boiling point.

Although the drawing illustrates the application of our invention to a fluid catalyst cracking system, it is applicable to cracking processes employing other schemes for catalyst handling. For example, pelleted or bead catalyst used in moving bed or fixed bed processes may be treated according to our invention. Indeed, pelleting silica-magnesia catalysts may lower the burning rate in which event water treatment is especially advantageous. With fixed bed processes, it is generally more convenient to treat the entire body of catalyst, but with moving bed processes as with fluid catalyst or suspension systems, we consider it desirable to treat only a portion of the catalyst inventory, as by continuously drawing off a slip stream of spent catalyst leaving the reactor and passing it through a vessel equipped with means for cooling, treating and drying the catalyst. For example, countercurrent contact with the cooling, treating and drying media may be effected in sections set off by a system of conventional grids and distributing plates designed to maintain uniform flow.

Hence, our present application represents a continuation-in-part of our applications Serial No. 79,674 and Serial No. 102,816 in applying water treatment to spent silica-magnesia cracking catalysts where improvement in regenerator coke burning capacity is the primary concern. Since coke burning capacity is probably the severest limiting factor on improving conversion levels and in utilizing fully and most economically the silica-magnesia catalysts of high cracking activity, the advantages of processes devoted specifically to improving the carbon burning rates of these cracking catalysts are evident.

We claim:
1. A method of treating spent silica-magnesia cracking catalysts which comprises treating the spent catalyst with water under conditions of elevated temperature of from about 150° F. to about 600° F., a pressure at least sufficient to insure the presence of liquid phase water in contact with the catalyst surface during the treatment at said temperature, and contact time ranging from several minutes to about 60 hours which is sufficient to effect a substantial increase in the carbon burning rate of the catalyst.

2. A method of treating spent silica-magnesia cracking catalysts which comprises treating the spent catalyst with water under conditions of elevated temperature of from about 212° F. to about 600° F., a pressure at least sufficient to insure the presence of liquid phase water in contact with the catalyst surface during the treatment at said temperature, and contact time ranging from several minutes to about 60 hours which is sufficient to effect a substantial increase in the carbon burning rate of the catalyst.

3. A method of treating spent silica-magnesia cracking catalysts which comprises treating the spent catalyst with saturated steam under conditions of temperature not exceeding 600° F., a pressure at least sufficient to insure the presence of liquid phase water in contact with the catalyst surface during the treatment at said temperature, and contact time ranging from several minutes to about 60 hours which is sufficient to effect a substantial increase in the carbon burning rate of the catalyst.

4. The method of regenerating a spent silica-magnesia cracking catalyst containing carbonaceous material deposited on the catalyst by conversion of petroleum hydrocarbons in the presence of said catalyst, which comprises treating the spent catalyst with water under conditions of elevated temperature of from about 150° F. to about 600° F., a pressure at least sufficient to insure the presence of liquid phase water in contact with the catalyst surface during the treatment at said temperature, and contact time ranging from several minutes to about 60 hours which is sufficient to effect a substantial increase in the carbon burning rate of the catalyst, and burning carbonaceous materials from said treated catalyst.

5. The method of regenerating a spent silica-magnesia cracking catalyst containing carbonaceous material deposited on the catalyst by conversion of petroleum hydrocarbons in the presence of said catalyst, which comprises treating the spent catalyst with saturated steam under conditions of temperature not exceeding 600° F., a pressure at least sufficient to insure the presence of liquid phase water in contact with the catalyst surface during the treatment at said temperature, and contact time ranging from several minutes to about 60 hours which is sufficient to effect a substantial increase in the carbon burning rate of the catalyst, and burning carbonaceous materials from said treated catalyst.

6. The method of claim 1 in which the temperature is about 150° to 200° F.

References Cited in the file of this patent
UNITED STATES PATENTS

| 2,414,736 | Gray | Jan. 21, 1947 |
| 2,495,723 | Harmann | Jan. 31, 1950 |